(12) United States Patent  
Bonang et al.

(10) Patent No.: US 7,270,456 B2  
(45) Date of Patent: Sep. 18, 2007

(54) ILLUMINATED FIBER OPTIC HAIR ORNAMENT AND METHOD FOR APPLYING AND MAKING THE SAME

(76) Inventors: Christopher C. Bonang, 5314 Soledad Rancho Ct., San Diego, CA (US) 92109; Nancy A. Booher, 1356 Lamplight Village La., Las Vegas, NV (US) 89123

( * ) Notice: Subject to any disclaimer, the term of this patent is extended or adjusted under 35 U.S.C. 154(b) by 0 days.

(21) Appl. No.: 10/948,592

(22) Filed: Sep. 23, 2004

(65) Prior Publication Data

US 2005/0068791 A1 Mar. 31, 2005

Related U.S. Application Data

(60) Provisional application No. 60/560,689, filed on Apr. 8, 2004, provisional application No. 60/505,399, filed on Sep. 25, 2003.

(51) Int. Cl.  
*F21V 8/00* (2006.01)

(52) U.S. Cl. .................. 362/555; 362/554; 362/570

(58) Field of Classification Search .............. 362/555, 362/554, 570, 571, 565, 806; 63/1.13, 33, 63/43, 40; 385/88–94; 132/273, 275  
See application file for complete search history.

(56) References Cited

U.S. PATENT DOCUMENTS

| | | | |
|---|---|---|---|
| 3,758,771 A * | 9/1973 | Frohardt et al. ............ 362/570 |
| 4,130,343 A * | 12/1978 | Miller et al. ................. 385/49 |
| 4,998,186 A | 3/1991 | Cocca |
| 5,018,053 A | 5/1991 | Belknap et al. |
| 5,497,307 A | 3/1996 | Bae et al. |
| 5,513,286 A * | 4/1996 | Easley ......................... 385/19 |
| 5,785,065 A | 7/1998 | Johnson |
| 6,105,586 A | 8/2000 | Hebenstreit |
| 6,142,158 A * | 11/2000 | Lloyd et al. ................ 132/275 |
| 6,295,400 B1 * | 9/2001 | Shahid ....................... 385/114 |
| 6,302,554 B1 | 10/2001 | Holce |
| 6,682,202 B2 | 1/2004 | Wong |
| 2003/0156429 A1 | 8/2003 | MacDonald |
| 2003/0174496 A1 | 9/2003 | Wong |
| 2004/0007243 A1 | 1/2004 | Paterson |

FOREIGN PATENT DOCUMENTS

JP          63110402 A  *  5/1988

* cited by examiner

*Primary Examiner*—Sharon Payne  
(74) *Attorney, Agent, or Firm*—Richard D. Clarke

(57) ABSTRACT

An illuminated hair ornament with fiber optics emitting lines of light and increased points of light is provided, where the illuminated ornament has a housing, a power supply coupled to the housing, a light source electrically coupled to the power supply, at least one fiber optic positioned to receive light from the light source, and includes one end protruding out and away from the housing. In one embodiment a reflective coating may be applied to the end of the fiber optic protruding from the housing, and in another embodiment, the one end protruding out and away from the hosing is cut at an angle to maximize observed brightness of the light. A sealant material may be applied to the fiber optics near the light source to prevent light from escaping from between the fiber optics. Also disclosed is a method for creating patterns of light across a user's hair.

5 Claims, 10 Drawing Sheets

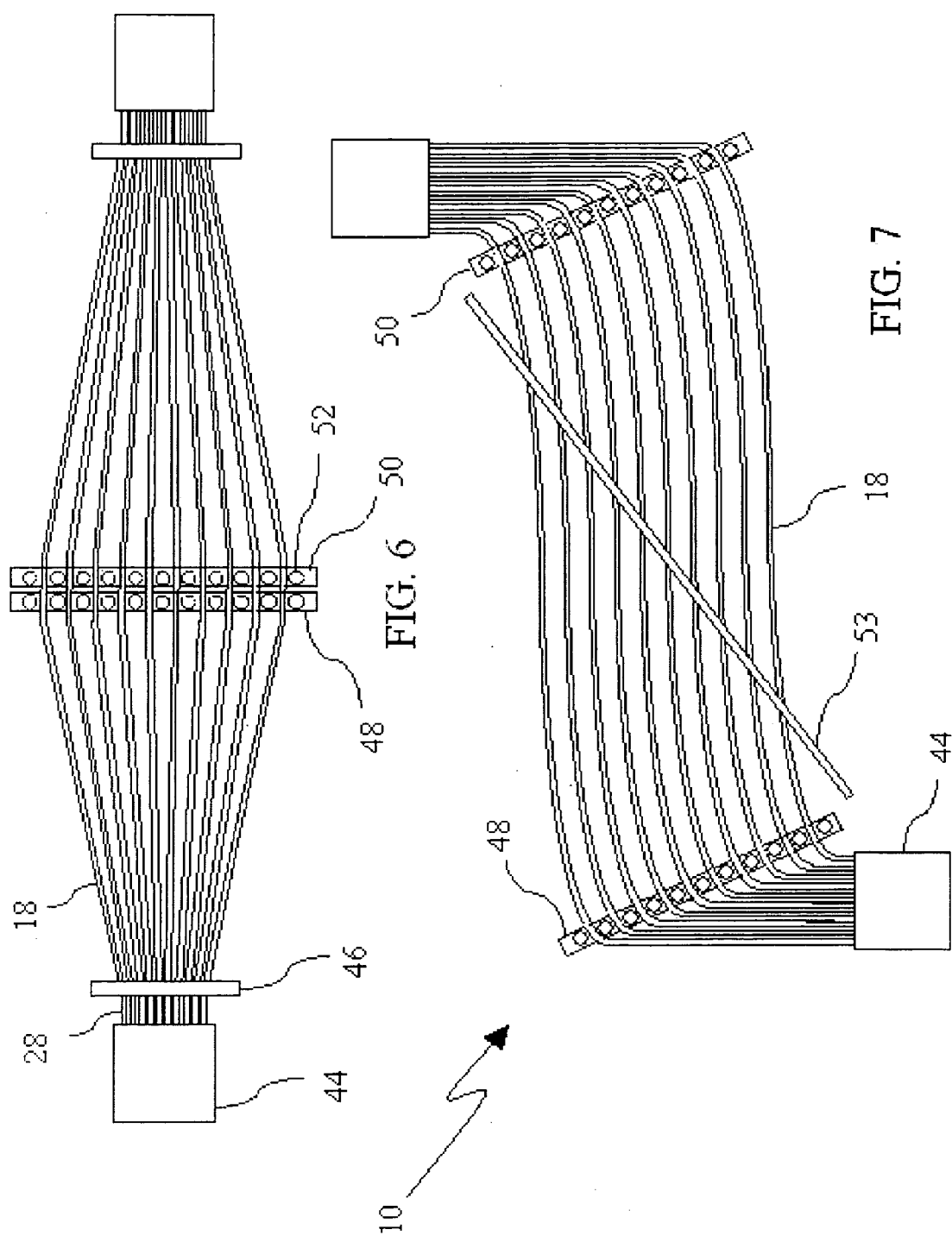

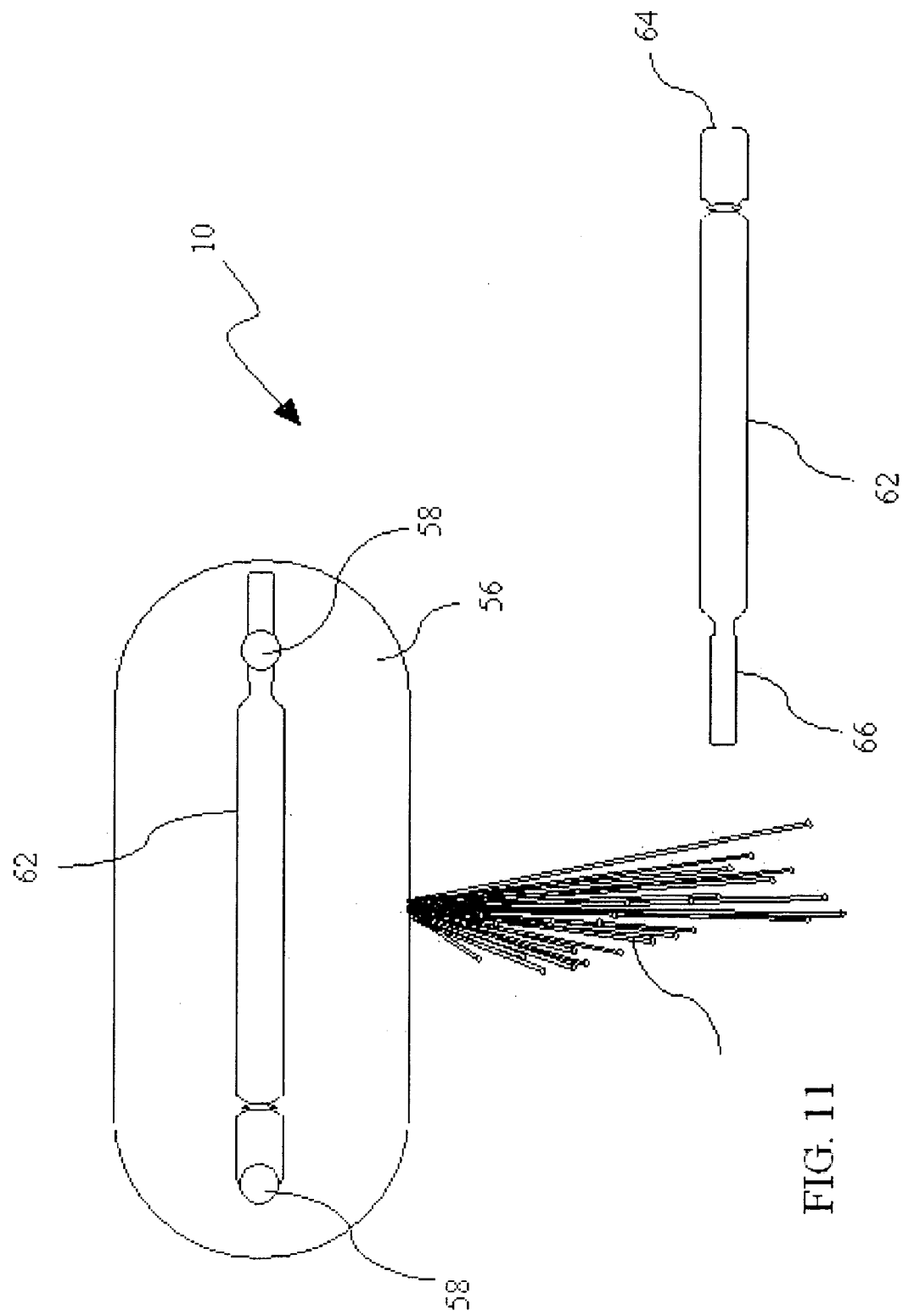

ILLUMINATED FIBER OPTIC HAIR ORNAMENT AND METHOD FOR APPLYING AND MAKING THE SAME

CROSS-REFERENCES TO RELATED APPLICATIONS

This application claims priority to U.S. Provisional Patent Application No. 60/560,689 entitled "REVERSIBLE, NON-SYMETRICAL BARRETTE WITH SLIDING LID" and filed on Apr. 8, 2004 for Christopher C. Bonang and U.S. Provisional Patent Application No. 60/505,399 entitled ILLUMINATED FIBER OPTIC HAIR ORNAMENT and filed on Sep. 25, 2003 for Christopher C. Bonang and Nancy A. Booher.

BACKGROUND OF THE INVENTION

1. Field of the Invention

This invention relates to decorative wearing apparel and more particularly to a reversible decorative hair ornament, which utilizes a power source, a light source, and fiber optics to provide a decorative effect thereto and a method for applying and making the same.

2. Description of the Related Art

Decorative hair ornaments have been used for thousands of years. In the past, hair ornaments included polished stones, feathers, thread, fabric, metal and plastic. Only recently have hair ornaments began incorporating electrical components, such as fiber optics, and light sources to improve the aesthetic appeal of such hair ornaments, especially for youth.

Traditional hair ornaments utilizing fiber optics and light sources are characterized by a point of light, or points of light, at the end(s) of the fiber optic(s). A light source near a bundle of fiber optics shines a light through the length of each fiber optic until it ultimately exits from an end of the fiber optic. A major objective of these traditional hair ornaments is to prevent the light from exiting the fiber optic (also known as "bleed out"), except from the end of the fiber optic. Bleed-out light is light that is traveling in the cladding or slightly imperfectly down the core of the fiber. At some point this light will leave the fiber, since it is not in one of the modes of the wave guide. Accordingly, a coating is applied to the entire fiber optic, which prevents bleed-out of transmitted light. This "bleed-out" of light reduces the point of light at the end of the fiber optic.

It is also noted that the residual light emanating from the fiber bundle near the light source may never have even been in the fiber; it may be between the fibers, but it creates an (generally) unattractive glow from the fiber bundle near the light source.

An additional disadvantage is that traditional hair ornaments utilizing fiber optics may only be used on one side of the head due to the direction of the fiber optics protruding from the barrette.

Another disadvantage of traditional hair ornaments utilizing fiber optics is that the light only exits from a tip of the fiber optic. Full advantage of the light emitting properties of fiber optics has not been achieved.

What is needed is an illuminated fiber optic ornament that is capable of creating a line of light, with fiber optics that may be cut to optimize light emission, a reversible clip, a method for creating the illuminated ornament, a method of cutting the fiber optics to predetermined angles and lengths, and a method for applying the ornament to a user's hair.

SUMMARY OF THE INVENTION

The present invention has been developed in response to the present state of the art, and in particular, in response to the problems and needs in the art that have not yet been fully solved by currently available decorative hair ornaments. Accordingly, the present invention has been developed to provide an improved illuminated ornament and method of making the same that overcome many or all of the above-discussed shortcomings in the art.

Specifically, in one embodiment an illuminated ornament comprises a housing, a power supply coupled to the housing, a light source electrically coupled to the power supply, at least one fiber optic positioned to receive light from the light source, and having one end protruding out and away from the housing, and a reflective coating applied to the end of the fiber optic protruding from the housing. The reflective coating is configured to reflect light transmitted through the fiber optic back into the fiber optic to create a line of light.

In another embodiment, a decorative hair ornament comprises a housing, a power supply coupled to the housing, a light source electrically coupled to the power supply, and a plurality of fiber optics bundled together and positioned proximate to the light source, and having one end protruding out and away from the housing, wherein the one end protruding out and away from the housing is cut at an angle to maximize observed brightness of the light. The angle may be between 15 and 75 degrees.

In yet another embodiment, the illuminated ornament comprises a plurality of fiber optics with a sealant material applied to the fiber optics near the light source to prevent light from passing through gaps between proximate fiber optics and out of the housing. The coating may be an opaque epoxy.

In a further embodiment, the ends of the fiber optics are cut substantially perpendicular with respect to the length, and the reflective coating is applied to the cut surface. However, the fiber optics may also be cut at an angle ranging between 15 and 75 degrees with respect to the length of the fiber optics.

In still another embodiment, the ornament is a hair barrette, which may include a securing means for attaching the barrette to a user's hair.

In yet another embodiment, a method for creating an illuminated ornament comprises the steps of cutting fiber optics to a predetermined length, cutting one end of the fiber optics to a predetermined angle, and applying a reflective coating to one end of the fiber optics to cause light traveling through the fiber optics to reflect into the fiber optic to create a line of light.

In still another embodiment, the method further comprises the steps of bundling the fiber optics together on one end and attaching the bundled fiber optics to a housing and proximate to a light source. A sealant material may be applied to gaps between each fiber optic at the bundle, and around an opening of the housing where the fiber bundle enters the housing to prevent light from passing through the opening and through gaps between fiber optics.

In one embodiment, the fibers are cut substantially perpendicular to the length of the fiber optic, while in another embodiment, the fibers are cut at an angle between 15 and 75 degrees with respect to the length of the fiber optic.

In still another embodiment, a method for cutting fiber optics of a fiber bundle to predetermined lengths and angles comprises the steps of removing a portion of a bundle cover from the fiber bundle, spreading the fiber optics, separating the fiber optics from each other with a separating means such that the fiber optics run parallel to each other, and cutting the fiber optics with a cutting means at a predetermined angle. In one embodiment, only a middle section of the bundle cover of the fiber bundle is removed such that ends of the fiber bundle remain covered with the bundle cover.

In a final embodiment, a method for creating a pattern on the user's hair using the illuminated ornament comprising the steps of securing the ornament to the user's hair, applying heat to the fiber optics for form the fiber optics in predetermined shapes, and cutting the fiber optic to predetermined lengths.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only traditional embodiments of the invention and are not therefore to be considered to be limiting of its scope, the invention will be described and explained with additional specificity and detail through the use of the accompanying drawings, in which:

FIG. 6 illustrates a method for spreading the fibers of an illuminated hair ornament according to one embodiment of the present invention;

FIG. 7 illustrates a method of spreading and simultaneously cutting all the fibers of an illuminated hair ornament according to one embodiment of the present invention;

FIG. 11 illustrates a bottom view of a reversible, non-symmetrical barrette according to one embodiment of the present invention;

FIG. 12 illustrates a view of a clip that may be attached to a reversible barrette according to one embodiment of the present invention;

DETAILED DESCRIPTION OF THE INVENTION

Figure 1:
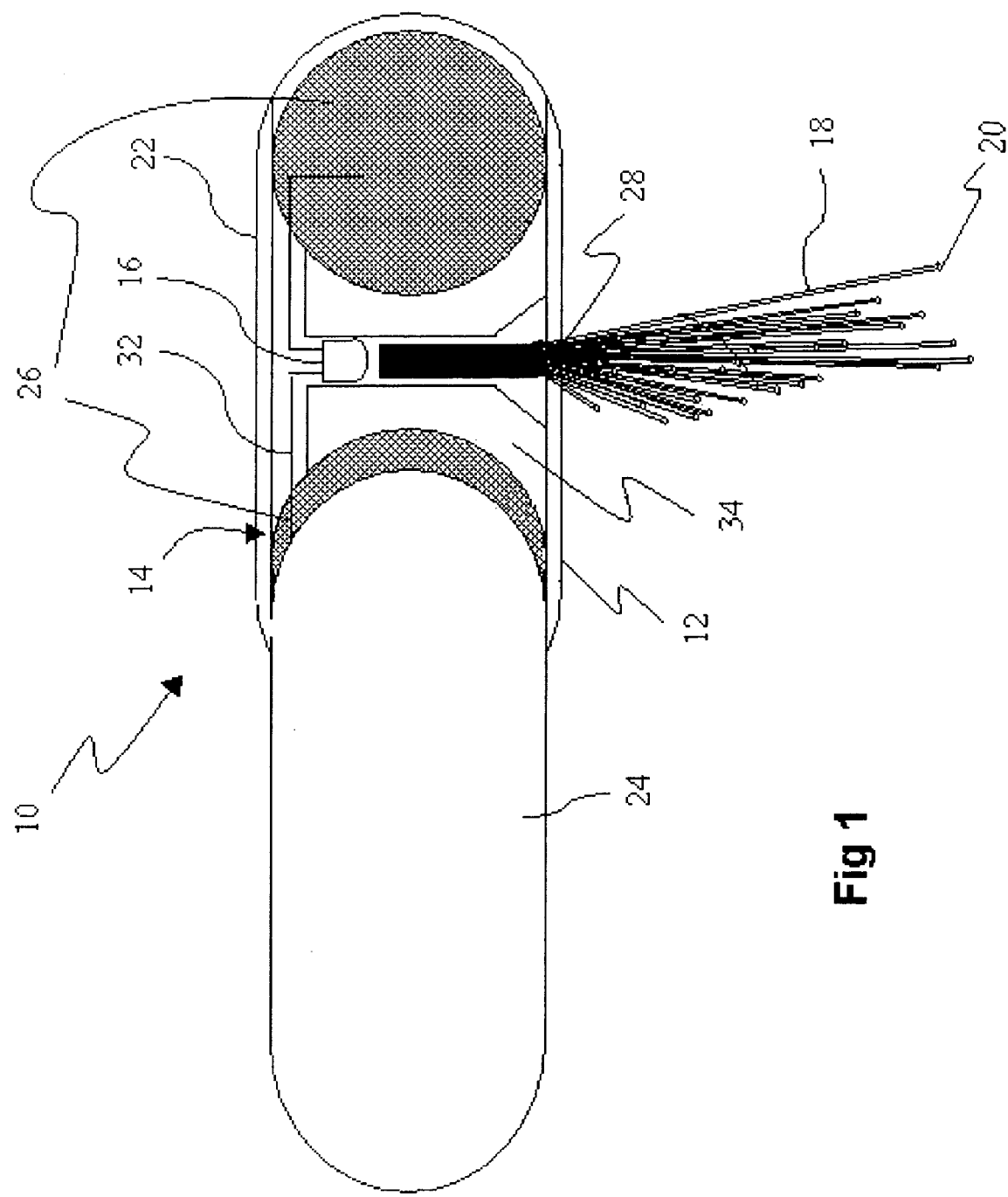
FIG. 1 illustrates a top view of an illuminated ornament according to one embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 illustrates a top view of an illuminated ornament 10 according to one embodiment of the present invention. The illuminated ornament 10 comprises a housing 12, a power supply 14 coupled to the housing 12, a light source 16, such as an LED, electrically coupled to the power supply 14, and a plurality of fiber optics 18 positioned to receive light from the light source 16, and having fiber ends 20 protruding out and away from the housing 12. In one embodiment, the light travels to the fiber ends 20 and reflects back into the fiber optics 18 to create a line of light. In another embodiment, the fiber ends 20 are cut at a predetermined angle to maximize observed brightness of the light at the fiber ends 20.

The housing 12 comprises at least two pieces; a case 22 with hollow compartments, and a sliding lid 24, which when closed conceals the compartments, or when open allows access to the compartments. In one embodiment, the power supply 14 comprises two batteries 26 to power the light source 16. One skilled in the art will recognize that more or less batteries 26 may be used to power more light sources 16.

The fiber optics 18 form a fiber bundle 28 where they enter the housing 12. In one embodiment, the fiber bundle 28 extends from only one side of the housing 12, making it nonsymmetrical.

The sliding lid 24 also has a metal strip (See FIG. 13) attached to an inner surface to provide an electrical contact between the two batteries 26, which provide power to the light source 16. Therefore, the sliding lid 24 may act as an on/off switch.

LED leads 32 contact the two batteries 26, which are respectively housed in battery cavities 34. The sliding lid 24 is shown in the open position, but can be slid shut to hide the internal compartments.

Figure 2:
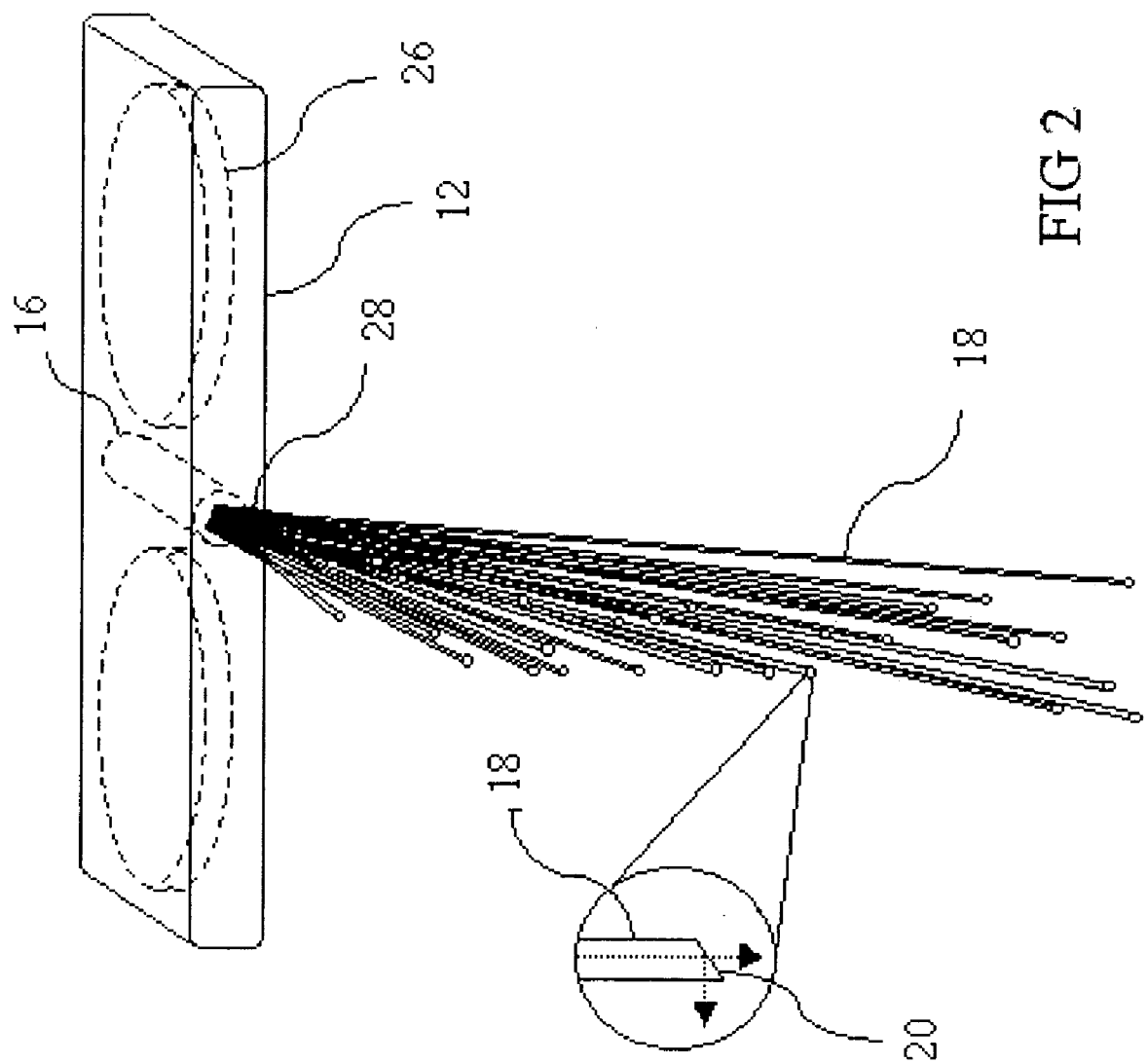
FIG. 2 illustrates a perspective view of an illuminated hair ornament according to one embodiment of the present invention.

FIG. 2 illustrates a perspective view of an illuminated ornament 10 with an asymmetrically distributed pattern of fiber optics 18, and therefore an asymmetrically distributed pattern of light points, according to one embodiment of the present invention. The fiber ends 20 are cut at an angle to maximize observed brightness of the light points. Observed brightness is increased due to the increased surface area of the exit from the fiber end 20. The fiber bundle 28 is positioned near the LED 16 such that the light from the LED 16 transmits into all the fibers optics 18 of the fiber bundle 28.

The fiber optics 18 are cut in a random, asymmetrical pattern. In one embodiment, the fiber ends 20 are cut at a 45-degree angle in order to maximize the intensity of light internally reflected within the fiber optics 18 and therefore maximize the intensity of light transmitted perpendicular to the fiber length and outwards away from a user towards observers. The remainder of the light traveling axially down the fiber optic 18 that is not reflected outward perpendicularly is transmitted downward and out the fiber end 20.

Figure 3:
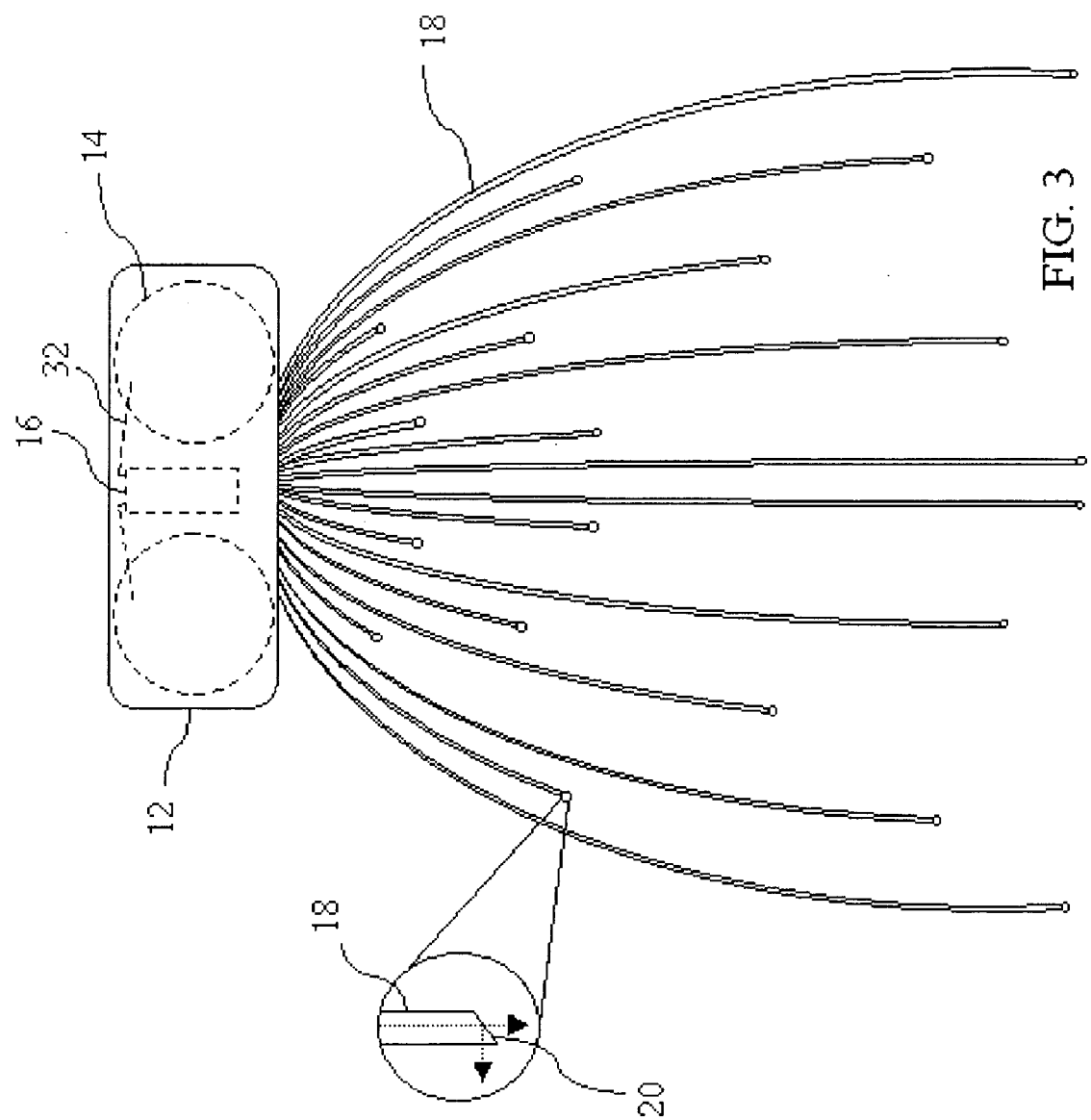
FIG. 3 illustrates a top view of an illuminated hair ornament according to one embodiment of the present invention.

FIG. 3 illustrates a top view of an illuminated ornament 10 with a symmetrically distributed pattern of fiber cuts, and therefore a symmetrically distributed pattern of light points, according to one embodiment of the present invention. Similar to the embodiment shown in FIG. 2, the fiber ends 20 are cut at a predetermined angle to maximize observed brightness of light points. A 45-degree cut is preferred, however, the cut may be between 15-75 degrees and still increase the intensity of light at the fiber end 20. In the illustrated embodiment, the fiber ends 20 are cut at a 45-degree angle in order to maximize the intensity of light internally reflected within the fiber optic 18 and therefore maximize the intensity of light transmitted perpendicular to the fiber length and outwards away from the user towards observers. The remaining light traveling axially down the fiber optic 18, that is not reflected outward perpendicularly, is transmitted out the fiber end 20.

Figure 4:
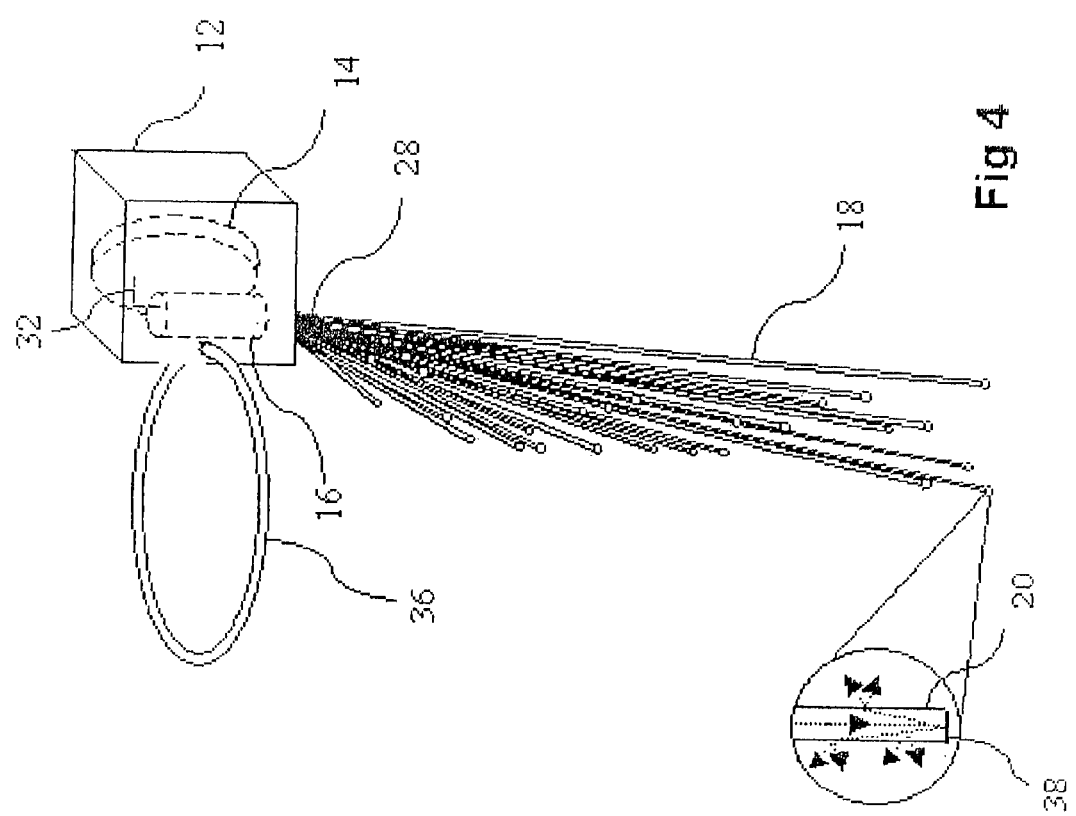
FIG. 4 illustrates a side perspective side view of an illuminated hair ornament according to one embodiment of the present invention.

FIG. 4 illustrates a perspective side view of an illuminated ornament 10 according to one embodiment of the present invention. The illuminated ornament 10 includes a ring 36 for attaching to a user's hair (not shown), or other part of the body or clothing, and a cubic housing 12. The fiber optics 18 are cut to provide an asymmetrically distributed pattern, and therefore an asymmetrically distributed pattern of light strands.

In one embodiment, the fiber ends 20 are cut at a 90-degree angle, which is coated with a reflective coating 38. Preferably, the reflective coating 38 is paint that is either sprayed or brushed onto the fiber ends 20. Additionally, it is preferable to use a paint with reflective particles that are smaller in size than the diameter of the fiber optic 18. Additional reflective material may be added to paint to increase the reflective properties. In another embodiment, the reflective material is a sticker-type coating that is applied to, and sticks to, the fiber ends 20. The light traveling axially down the fiber optic 18 is reflected back up the fiber optic 18. The reflected light travels in both the core and the cladding of the fiber optic 18 and thus is scattered sideways and out of the fiber optic 18. The entire length of fiber optic 18 therefore emanates light and appears as a "line" of light.

Figure 5:
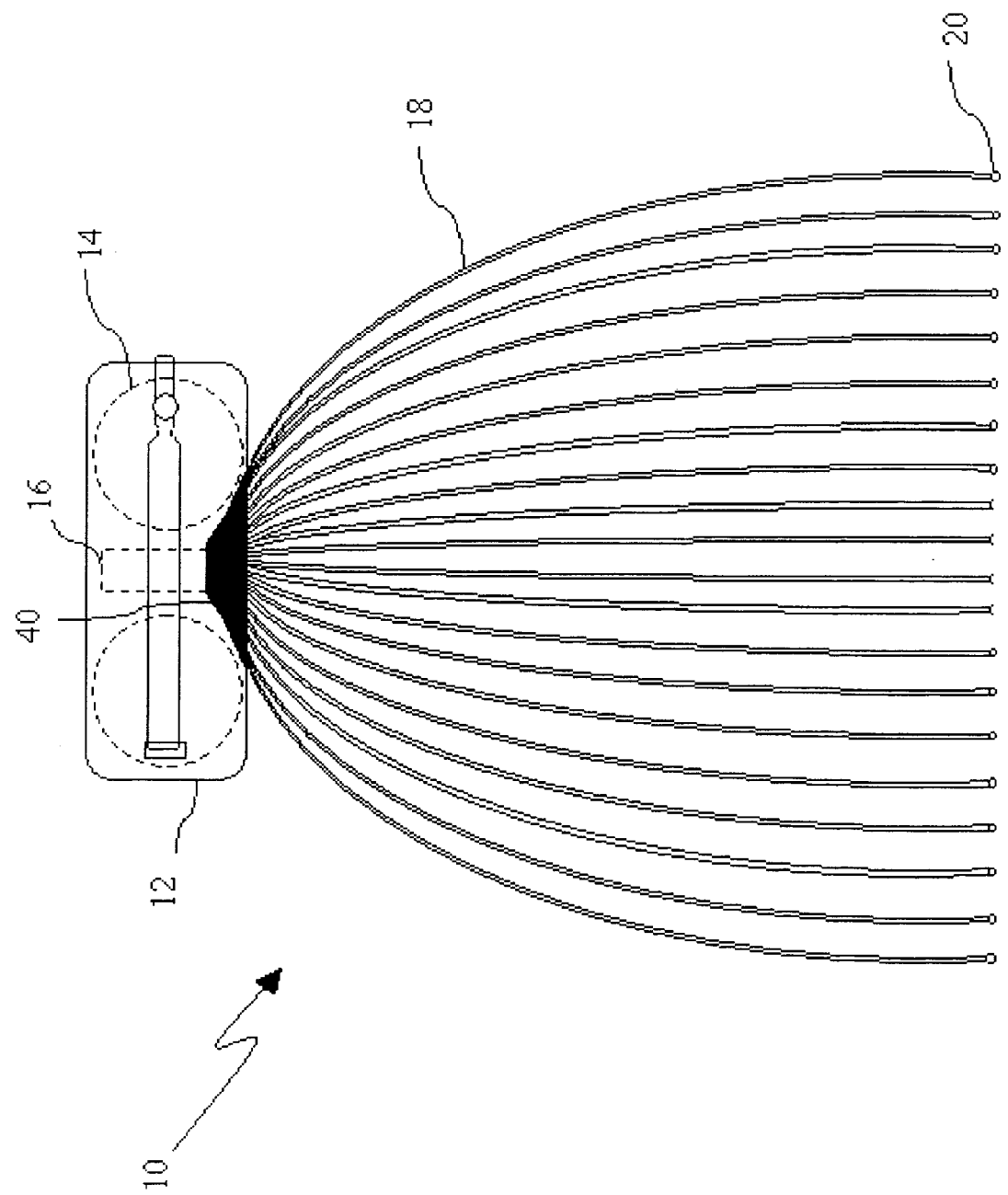
FIG. 5 illustrates a top view of an illuminated hair ornament being sealed to prevent light loss through a housing according to one embodiment of the present invention.

FIG. 5 illustrates a top view of a sealed illuminated ornament 10 to prevent light loss through the housing 12 according to one embodiment of the present invention. In one embodiment, the illuminated ornament 10 includes a symmetrically-distributed pattern of uniform length fiber optics 18, and therefore a symmetrically-distributed pattern of light points.

The fiber optics 18 are secured in a fanned out distribution by a sealant material 40. The sealant material 40 may be epoxy, or a small comb of thin teeth between each fiber optic 18. Opaque black epoxy may be utilized to block any unattractive residual light from the light source 16 that would otherwise be transmitted between the fiber optics 18. Advantageously, the sealant material 40 serves to hold the fiber optics 18 in a predetermined shape and blocks residual light from escaping through gaps between the fiber optics 18 in the fiber bundle 28. Consequently, light transmittal through the fiber optics 18 increases.

In one embodiment, the fiber optics 18 are cut in a symmetrical pattern of uniform length, and maintain this basic distribution due to the sealant material 40.

FIGS. 6 and 7 illustrate a method for spreading and simultaneously cutting the fiber optics 18 of an illuminated ornament 10 according to one embodiment of the present invention. In one embodiment, the method provides for each fiber optic 18 to be cut at a different length and at a predetermined angle to maximize observed brightness. In another embodiment a method is taught for spreading and securing the fiber optics 18 such that the light points generated are maintained in a symmetrical or asymmetrical pattern. For example, the fiber optics 18 may be brushed into the hair of a user. The pattern in the hair is determined by the symmetrical or asymmetrical pattern of the illuminated ornament 10.

In operation, the bundle cover 44 is removed, or peeled back thus revealing a center portion 45 of the fiber bundle 28 and leaving the ends of the fiber bundle 28 covered. The fiber optics 18 emerging from the bundle cover 44 are flattened and spread out by a spreading means, such as a two-piece clip 46. A separating means, such as, but not limited to, combs 48 and 50 spread the individual fiber optics 18 between comb teeth 52.

Referring to FIG. 7, the combs 48 and 50 are moved apart from each other to spread the fiber optics 18 into a parallel position with respect to each other. A holding means may be used to hold the fiber optics 18. The combs 48 and 50 may be configured to spread and hold the fiber optics 18. A cutting means 53, such as a blade or scissors, cuts the fiber optics 18 at a predetermined angle. In the illustrated embodiment, the fiber optics 18 are cut at approximately 45-degrees. One skilled in the art would recognize that any other angle may be acceptable. Preferably, however, the fiber optics 18 may be cut at an angle between 15 and 75 degrees. It is noted that the angled cut results in a different length for each fiber optic (18). It is further noted that cutting the fiber optics 18 at a predetermined angle simultaneously cuts the fiber optics 18 to predetermined lengths.

Figure 8:
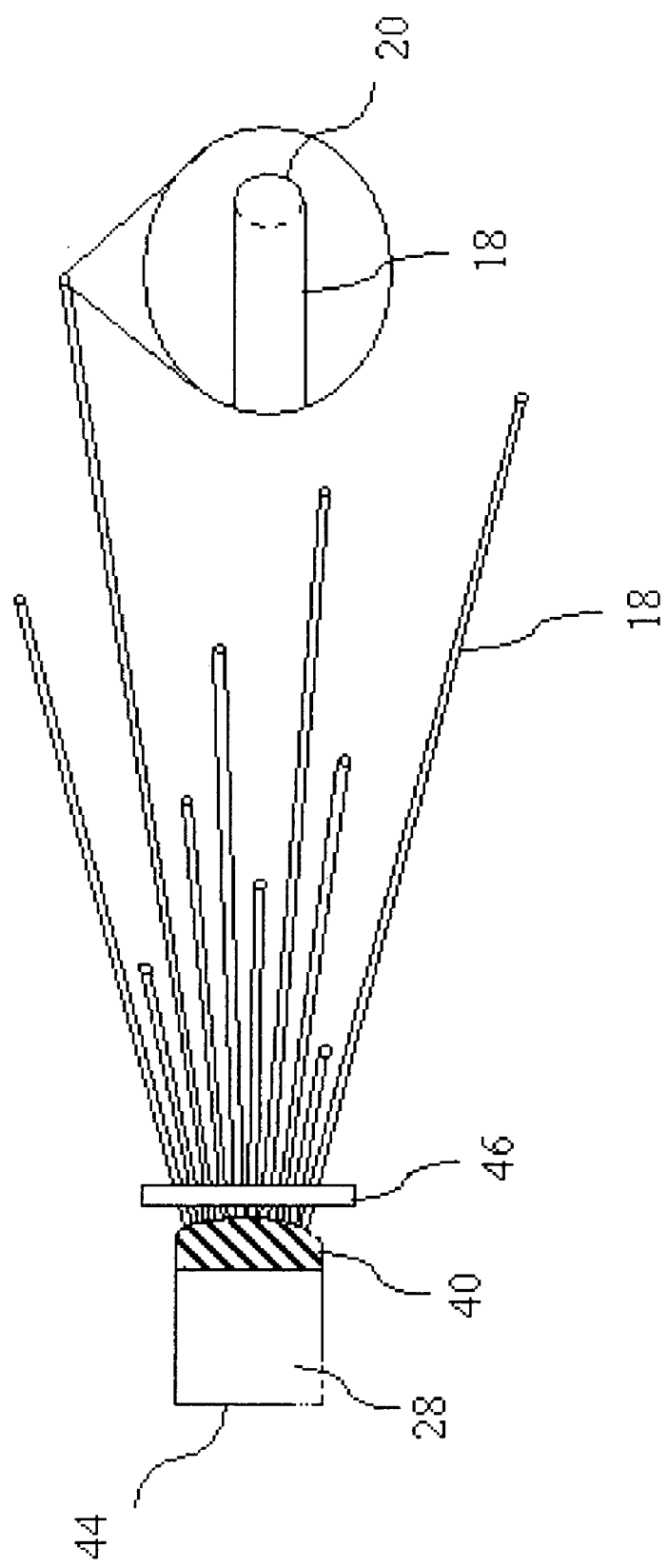
FIG. 8 illustrates a top view of a method for securing the fibers of an illuminated hair ornament in a maintainable and attractive pattern according to one embodiment of the present invention.

FIG. 8 illustrates a top view of a method for securing the fibers 18 of an illuminated hair ornament 10 in a maintainable and attractive pattern according to one embodiment of the present invention. The jacketed bundle 44 is rotated 90 degrees relative to the positions shown in FIGS. 6 and 7. In other words, the jacketed bundle 44 is rotated to move the fiber optics 18 from a horizontally flat position to a vertical position. The fiber optics 18 emerging from the jacketed bundle 44 are flattened and spread out by the two-piece clip 46 (See FIG. 7). Because the fiber bundle 20 has been rotated 90 degrees relative to the cutting procedure previously utilized in FIG. 6, the fiber optics 18 of various length are randomly distributed, creating an attractive and uniformly distributed pattern of light points. The fiber optics 18 are secured in place by the sealant material 40. The sealant material has the additional purpose of blocking any unattractive, residual light transmitted between the fiber optics 18 and the light source 16 (See FIG. 1).

Figure 9:
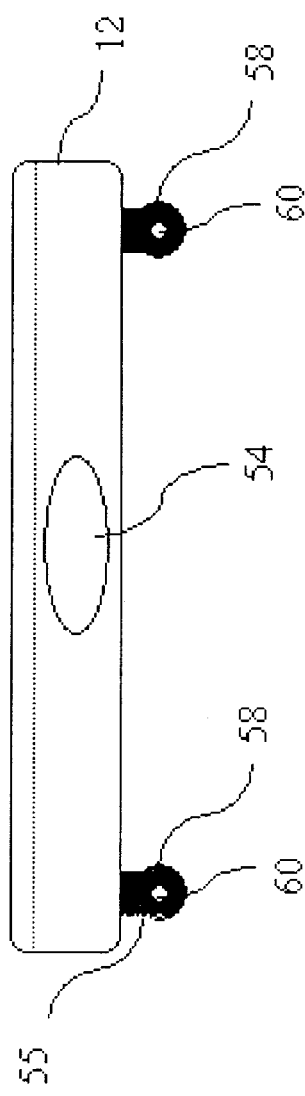
FIG. 9 illustrates a side view of a reversible, nonsymmetrical barrette according to one embodiment of the present invention.
Figure 10:
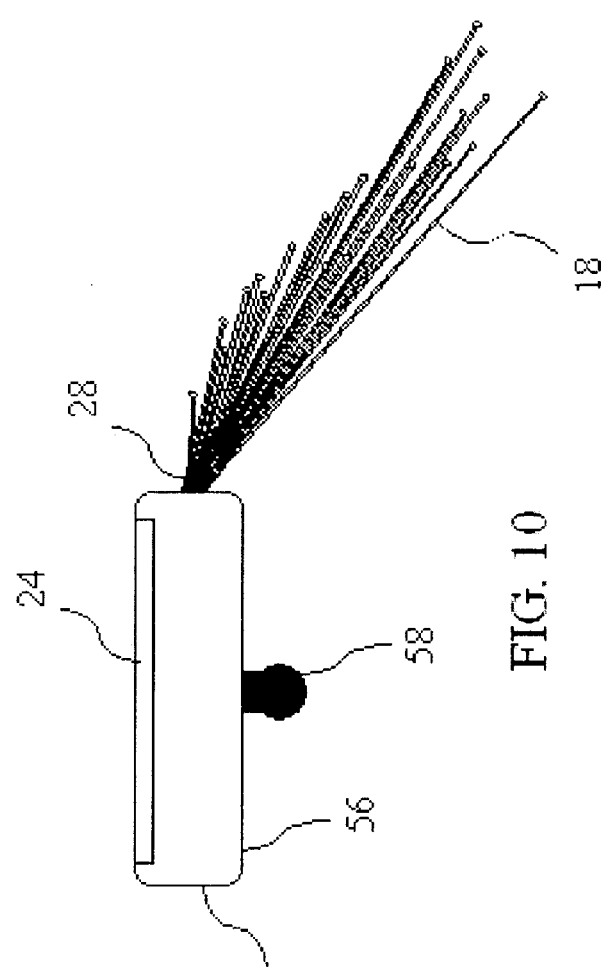
FIG. 10 illustrates an end view of a reversible, nonsymmetrical barrette according to one embodiment of the present invention.

FIGS. 9 and 10 illustrate a side and end view of a reversible, nonsymmetrical barrette 10 according to one embodiment of the present invention. The housing 12 includes an opening 54 on one side out of which extends the fiber bundle (See FIG. 2). The fiber bundle 28 extends from one side of the barrette 10, making the barrette 10 nonsymmetrical.

In one embodiment, two identical posts 55 protrude from a bottom 56 of the housing 12. Each post 55 includes a ball-shaped end 58. A horizontal hole 60 passes through each ball-shaped end 58. A securing means, wire, or clip 62 (See FIG. 12), configured to attach the housing to the user, or to the user's hair or clothing, can be inserted into either hole 60. Specifically, end pieces 64 may be inserted into each hole 60 to allow the clip 62 to rotate. Consequently, if the user desires to attach the barrette to an opposite side of the user's body, the user can remove the clip 62 from one hole 60 and place the clip 62 in the other hole, thus making the barrette 10 reversible.

FIGS. 11 and 12 illustrate a bottom view of a reversible, nonsymmetrical barrette 10 with the clip 62 attached and the clip 62 according to one embodiment of the present invention. As discussed above, the end pieces 64 functionally couple the hole 60 of the post 55 (See FIG. 9). The end pieces 64 are flexible to allow the end pieces 64 to enter into the holes 60 (See FIG. 9) without permanent deformation.

A locking end 66 of the clip 62 is configured to slip over, and clamp to the opposite ball-shaped end 58 to lock the barrette 10 to the user's hair, or other article. As discussed above, the clip 62 is reversible and can be attached to either ball-shaped end 58 to accommodate placement of the barrette 10 on either side of the head with the fiber bundle 20 (See FIG. 1) extending in any desired direction.

Figure 13:
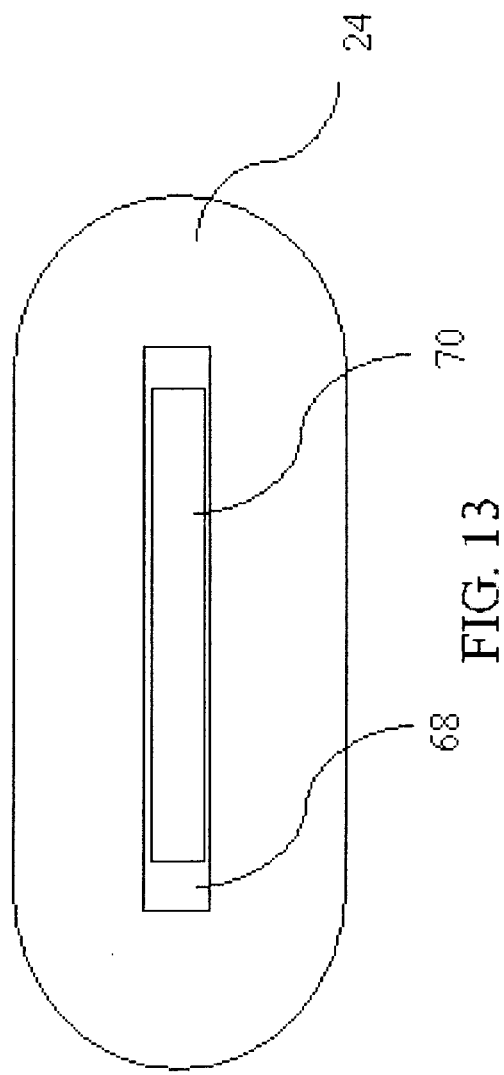
FIG. 13 illustrates a bottom view of the sliding lid portion of a barrette according to one embodiment of the present invention.
Figure 14:
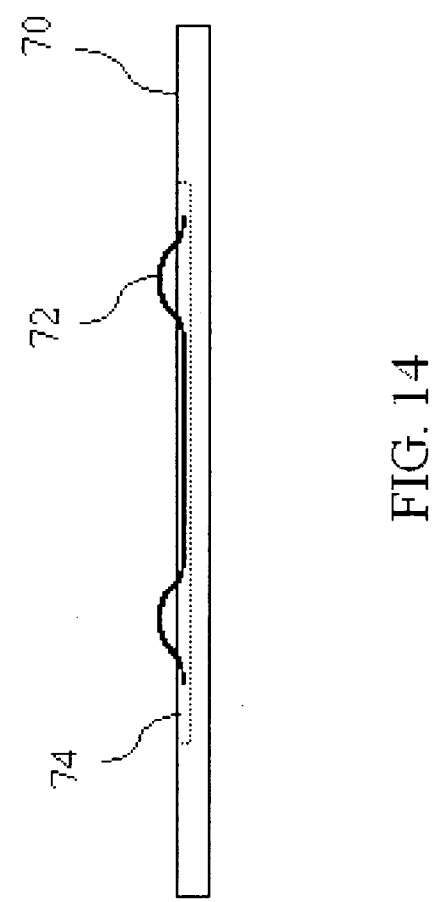
FIG. 14 illustrates a side view of the sliding lid portion of a barrette according to one embodiment of the present invention.

FIGS. 13 and 14 illustrate a bottom and side view of the sliding lid portion of a barrette according to one embodiment of the present invention. A slot 68 in the sliding lid 24 contains a metal strip 70 that acts as an electrical contact between the two batteries 26 (See FIG. 1) when the sliding lid 24 is closed. The metal strip 70 has two bumps 72 extending upward to provide a good contact with the batteries 26. Extra space 74 in the slot 68 allows the bumps 72 to compress slightly when in contact with the batteries 26. When the sliding lid 24 is slid open, contact with the batteries 26 is lost, and the LED 16 (See FIG. 1) turns off, effectively acting as an on/off switch.

The illuminated ornament 10 may be used to create attractive patterns of brilliant points of colored light distributed across the surface or just under the surface of the hair by fanning out the fiber optics 18, securing them in place, applying heat to each fiber optic 18, or to the hair as a whole, and cutting them at various lengths. Adding heat to the fiber optics 18 allows the fiber optics 18 to form to the shape of the user's head, or to a specific shape. Patterns include, but are not limited to a nearly symmetrical pattern with the light points spread out uniformly like stars in a constellation, an asymmetrical pattern with individual light points or clusters of light points cascading together with the natural curvature of the hair like a waterfall, and a symmetrical pattern in which all the fibers 18 are of uniform length. One skilled in the art will recognize that that there are numerous other patterns that may be created.

It is understood that the above-described arrangements are only illustrative of the application of the principles of the presently illustrated invention. The present invention may, however, be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the specification discusses the use of a sliding lid 24, it is envisioned that the lid may be hinged, or the lid may friction fit, clamp, or be permanently attached to the housing 12.

It is also envisioned that the housing 12 may comprise a plurality of light sources 16, each light source 16 producing different colors.

It is also envisioned that the illuminated ornament may further comprise a control module for determining which light sources 16 are to be used to control preprogrammed light patterns, colors, and individual fiber optic bundles.

Although the specification distinguished between nonsymmetrical and symmetrical fiber optic 18 patterns, it is envisioned that each embodiment may comprise groups of symmetrical and nonsymmetrical fiber bundles 28.

Although the specification discusses the use of a clip for securing the barrette 10 to the user, it is envisioned that any type of securing means may be used, such as, but not limited to clasps, clamps, bands, and belts.

Although the specification and the illustrated embodiments show a housing that envelopes all the components, it is envisioned that the housing 12 may simply be a type of channel, or shroud, configured to direct light from the light source 26 into the fiber optics 18.

It is also envisioned that a plurality of fiber bundles 28 may be utilized and attached to the housing 12 and controlled by separate light sources 26.

It is also envisioned that illuminated ornaments 10 may be configured to produce points of light as well as lines of light. Specifically, some fiber optics 18 may be configured to create lines of light, while other fiber optics 18 of the same or different fiber bundle 28 may be configured to create points of light.

Finally, while 15-75 degrees for an angle of cut is preferred, the angle may actually be from 1 to 89 degrees. A single illuminated ornament 10 may comprise fiber optics 18 cut to varying angles.

Thus, while the present invention has been fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method for cutting fiber optics of a fiber bundle to predetermined lengths and angles comprising the steps of: providing a fiber bundle comprising a plurality of fiber optics; providing a bundle cover over the fiber bundle; removing a portion of the bundle cover from the fiber bundle wherein only a middle section of the bundle cover of the fiber bundle is removed such that the ends of the fiber bundle remain covered with the bundle cover; spreading the fiber optics; separating the fiber optics from each other with a separating means such that the fiber optics run parallel to each other; and cutting the fiber optics with a cutting means at a predetermined angle.

2. The method according to claim 1, wherein the fiber optics are cut at substantially the same time.

3. A method for decorating a user's hair with an illuminated fiber optic ornament comprising the steps of: taking a decorative ornament having a housing, a power source coupled to said housing, a light source electrically coupled to said power source, and a plurality of fiber optics bundled together and positioned proximate to said light source and having one end of said plurality of fiber optics protruding out and away from said housing; attaching the decorative ornament to the user's hair; securing said plurality of fiber optics to the user's hair; applying heat to each fiber optic and forming the fiber optics to a predetermined pattern across the user's hair; and cutting said fiber optics to various lengths.

4. The method according to claim 3 further comprising the step of applying a reflective coating to ends of the fiber optics such that light traveling through fiber optic reflects back into the fiber optic to create a line of light.

5. The method according to claim 3 further comprising the step of cutting ends of the fiber optics to an angle less than 90 degrees with respect to a longitudinal axis of the fiber optic to create brilliant points of light.

* * * * *